(12) United States Patent
Weiman et al.

(10) Patent No.: US 12,544,093 B2
(45) Date of Patent: Feb. 10, 2026

(54) POWERED DISCECTOMY APPARATUS

(71) Applicant: GLOBUS MEDICAL, INC., Audubon, PA (US)

(72) Inventors: Mark Weiman, Downingtown, PA (US); Corbett McLaughlin, Philadelphia, PA (US); Stephen Schilling, Conshohocken, PA (US); Myles Sullivan, Philadelphia, PA (US); Chad Glerum, Pennsburg, PA (US)

(73) Assignee: Globus Medical, Inc., Audubon, PA (US)

( * ) Notice: Subject to any disclaimer, the term of this patent is extended or adjusted under 35 U.S.C. 154(b) by 353 days.

(21) Appl. No.: 18/308,882

(22) Filed: Apr. 28, 2023

(65) Prior Publication Data

US 2024/0358392 A1    Oct. 31, 2024

(51) Int. Cl.
*A61B 17/32*    (2006.01)
*A61B 17/00*    (2006.01)

(52) U.S. Cl.
CPC ............ *A61B 17/32002* (2013.01); *A61B 2017/00261* (2013.01); *A61B 2017/00867* (2013.01); *A61B 2017/320032* (2013.01)

(58) Field of Classification Search
CPC .. A61B 17/32002; A61B 2017/320032; A61B 2017/320028; A61B 2017/320024; A61B 17/320758; A61B 2017/320766; A61B 2017/320775; A61B 17/320783; A61B 2017/320791; A61B 17/1622
See application file for complete search history.

(56) References Cited

U.S. PATENT DOCUMENTS

| | | |
|---|---|---|
| 5,755,731 A | 5/1998 | Grinberg |
| 6,464,711 B1 | 10/2002 | Emans et al. |
| 8,382,742 B2 | 2/2013 | Herman et al. |
| 9,119,637 B2 | 9/2015 | Tornier et al. |
| 9,254,138 B2 | 2/2016 | Siegal et al. |
| 10,178,998 B2 | 1/2019 | Guo et al. |
| 11,129,672 B2 | 9/2021 | Prokop et al. |
| 11,471,145 B2 | 10/2022 | Pacheco-Serrant et al. |
| 11,510,687 B2 | 11/2022 | Bhatia et al. |

(Continued)

FOREIGN PATENT DOCUMENTS

| | | |
|---|---|---|
| WO | 2019178575 A1 | 9/2019 |
| WO | 2022263429 A1 | 12/2022 |

*Primary Examiner* — Thomas Mcevoy

(57) ABSTRACT

An apparatus for use in preparing the intervertebral disc space. The apparatus includes a powered disc cutter that can be inserted through a tube and into the disc space. Once inside the disc space, the cutter can be rotated on its axis and articulated through the disc space to break up and disconnect the disc tissue from the surrounding disc tissue and disc annulus. The device is powered by a handheld driver that utilizes a motor to impart motion, such as rotary motion, to an elongated shaft assembly having a cutting tool or assembly pivotably attached to the distal end thereof. The cutting tool is mounted to the end of the drive shaft assembly by a linkage so that the shaft may be inserted in a straight configuration down a narrow access port. The cutting assembly can spin on its axis while being articulated providing access to the intervertebral space.

18 Claims, 6 Drawing Sheets

(56) References Cited

U.S. PATENT DOCUMENTS

2009/0018566 A1\* 1/2009 Escudero ........... A61B 17/3207
   606/159
2021/0298782 A1 9/2021 Begg et al.
2024/0156489 A1\* 5/2024 Patel .............. A61B 17/320758

\* cited by examiner

POWERED DISCECTOMY APPARATUS

FIELD

The present application generally relates to a device for use in a spinal surgery. In particular, the disclosure is directed to devices and methods for the removal of intervertebral discs as part of a surgical procedure.

BACKGROUND

Disc degeneration is a condition of the spine that causes the vertebral bodies to compress the nerves that protrude from the transforaminal space. To alleviate such a condition a "spinal decompression" must be performed for which there are various procedures. During these procedures, the proper spacing between the vertebral bodies may be restored by placing an implant therebetween resulting in a fusion of the bodies. Alternatively, a protruding disc can be removed by performing a micro-discectomy.

To access the spine a large incision must be made over the affected area. While allowing access to the affected area, it is desirable to minimize the incision used in performing spinal fusion by use of minimally invasive techniques. One such technique is TLIF or transforaminal lateral interbody fusion. This procedure minimizes the risks to the patient such as infection, recovery times and the formation of scar tissue. In the case of the formation of scar tissue, this can protrude into the transforaminal space requiring further surgical revision. In performing such procedures a small incision is made and an access port such as a tube is inserted into the incision and guided to the affected region of the spine.

Regardless of the technique used, a discectomy procedure is generally necessary to remove the intervertebral disc to prepare the vertebrae for the fusion procedure. Many tools exist for performing this procedure, but most of these are manual tools that are not well suited to minimally invasive techniques. For example, most tools require manual manipulation by the surgeon requiring both surgical skill and care to avoid damage to the surrounding vertebral bodies. The use of power tools may ease the procedure, thereby reducing injury to surrounding tissues and shortening the post-operative recovery period.

During minimally invasive procedures, not only is decreased surgical times desired, but so too is the ability to work within smaller access spaces. In such procedures disc removal can be very difficult, technically demanding, and time-consuming, especially where the access window to the disc is much smaller. This limited access window also makes visualization and evaluation of the quality of the disc removal and endplate preparation very difficult.

With the reality of these technical challenges and access limitations, along with a desire to further reduce the damage caused to the patient during surgical access, the need for an improved, powered device to efficiently remove the disc material and prepare the vertebral endplates is clear.

SUMMARY OF THE DISCLOSURE

An apparatus for use in preparing the intervertebral disc space is disclosed. The apparatus generally comprises a powered disc cutter that can be inserted through a tube and into the disc space. Once inside the disc space, the cutter can be rotated on its axis and articulated through the disc space to break up and disconnect the disc tissue from the surrounding disc tissue and disc annulus.

The device is powered by a handheld driver that utilizes a motor to impart motion, such as rotary motion, to an elongated shaft assembly having a cutting tool or assembly pivotably attached to the distal end thereof. In one possible implementation, the cutting tool is mounted to the end of the drive shaft assembly by a linkage so that the shaft may be inserted in a straight configuration down a narrow access port. The cutting assembly can spin on its axis while being articulated up to potentially 80° or 90° which provides reach across the intervertebral space.

In certain implementations, the elongated shaft assembly comprises an outer sheath that surrounds an inner sheath in a manner that allows the inner sheath to move therein. The outer sheath is fixedly attached to the driver while the inner sheath is connected to the driver such that the driver can impart motion to the inner sheath. The two sheaths cooperate to allow the cutting assembly to rotate about its access. This is accomplished by mounting the outer sheath such that it translates along the longitudinal length of the inner sheath.

The cutting assembly comprises a cutting tip, flexible joints, and a drive pin. In one possible version of this implementation, each of the components is mounted on a flexible shaft that can be constructed from materials such as nitinol. The tip, along with articulating drive components, is constrained together by crimping caps onto both ends of, for example, a super-elastic nitinol shaft that goes through the center of the components. The nitinol is flexible enough to allow the full articulation and rotation of the cutter. The nitinol is pre-biased or memory shaped such that it biases toward a bend. The cutter assembly is designed to allow removal from the overall tool and replacement as a disposable assembly.

In accordance with implementations of this disclosure, a series of disc joints connects to the cutting tip and can allow for at least 10° of angulation at each interface. The number of discs can be varied to provide the desired angle of total articulation. As the number of discs is reduced, the amount of angulation required at each interface is increased. By way of example, to reach the same 80° of angulation with 3 discs, there would be 4 interfaces needing to angle 20° each.

The cutting assembly includes a cutting tip which can have a variety of shapes. One configuration is a tip with jagged edges which grab and retain disc material. The design of the tip is such that it can easily cut tissue but is not suited to cut harder material such a vertebral bone without exerting greater and purposeful effort. Alternatively, the cutting tip may be replaced by a shaft with roughened surfaces. The shaft can be biased to incrementally bend in a range of angles as it is moved through a desired cutting motion.

The linkage assembly and the cutting tool are connected to the inner shaft. When the outer sheath is in a first position, it covers the linkage. As the outer sheath is translated proximally, it uncovers a portion of the distal end of the inner shaft. The nitinol shaft acts upon the joints to articulate the tip in an angular direction. The linkage assembly allows the tip to rotate about a proximal axis.

The surgeon imparts motion to the outer sheath by depressing a handle, in one possible implementation. The handle is pivotably connected to a housing that connects the outer sheath to the driver. The housing is fixed to the driver and includes an elongated section. The outer sheath includes a collar at its proximal end that is mounted on the elongated section. Interposed between the collar and the main section of the housing sits an actuation spring. As the handle is depressed, the retention spring is compressed such that upon release of the handle the spring is released, and the outer sheath is returned to its original position. At such point, the distal end of the inner sheath and the linkage mounted thereon are covered, returning the cutting tip to a straight configuration. This allows the surgeon to withdraw the shaft assembly back through the narrow window.

The foregoing has outlined rather broadly the more pertinent and important features of the device so that the detailed description that follows may be better understood. Additional features will be described hereinafter which form the subject of the claims of the invention. It should be appreciated by those skilled in the art that the conception and the disclosed specific methods and structures may be readily utilized as a basis for modifying or designing other structures for carrying out the same purposes of the device. It should be realized by those skilled in the art that such equivalent structures do not depart from the spirit and scope of the appended claims.

BRIEF DESCRIPTION OF DRAWINGS

The above and other objects, features and advantages of the present disclosure will be more apparent from the following detailed description taken in conjunction with the accompanying drawings, in which.

DETAILED DESCRIPTION

Figure 1:
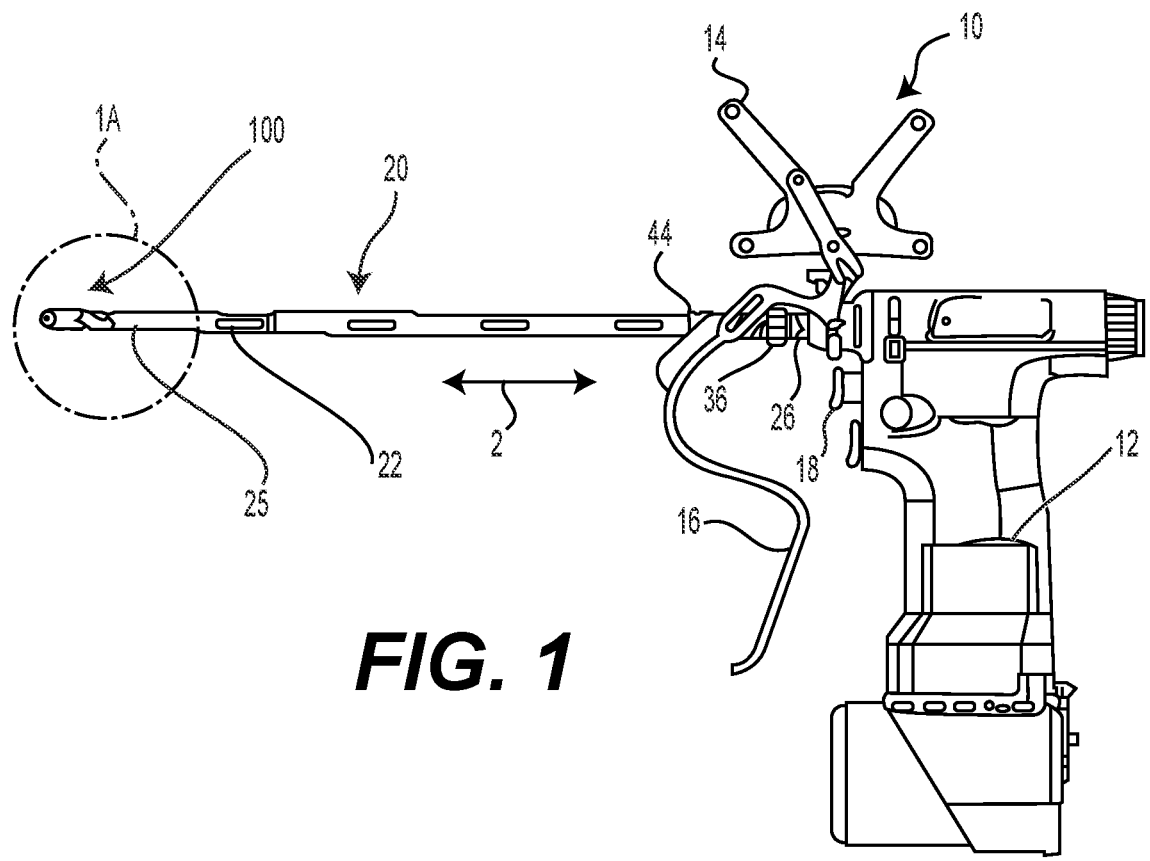
FIG. 1 is a side view of a powered discectomy apparatus according to one possible implementation of the present disclosure, showing the cutting tip in a longitudinally aligned configuration.

Exemplary embodiments are described herein to provide a detailed description of the present disclosure. Variations of these embodiments will be apparent to those of skill in the art. Moreover, certain terminology is used in the following description for convenience only and is not limiting. For example, the words "right," "left," "top," "bottom," "upper," "lower," "inner" and "outer" designate directions in the drawings to which reference is made. The word "a" is defined to mean "at least one." The terminology includes the words above specifically mentioned, derivatives thereof, and words of similar import.

Figure 2:
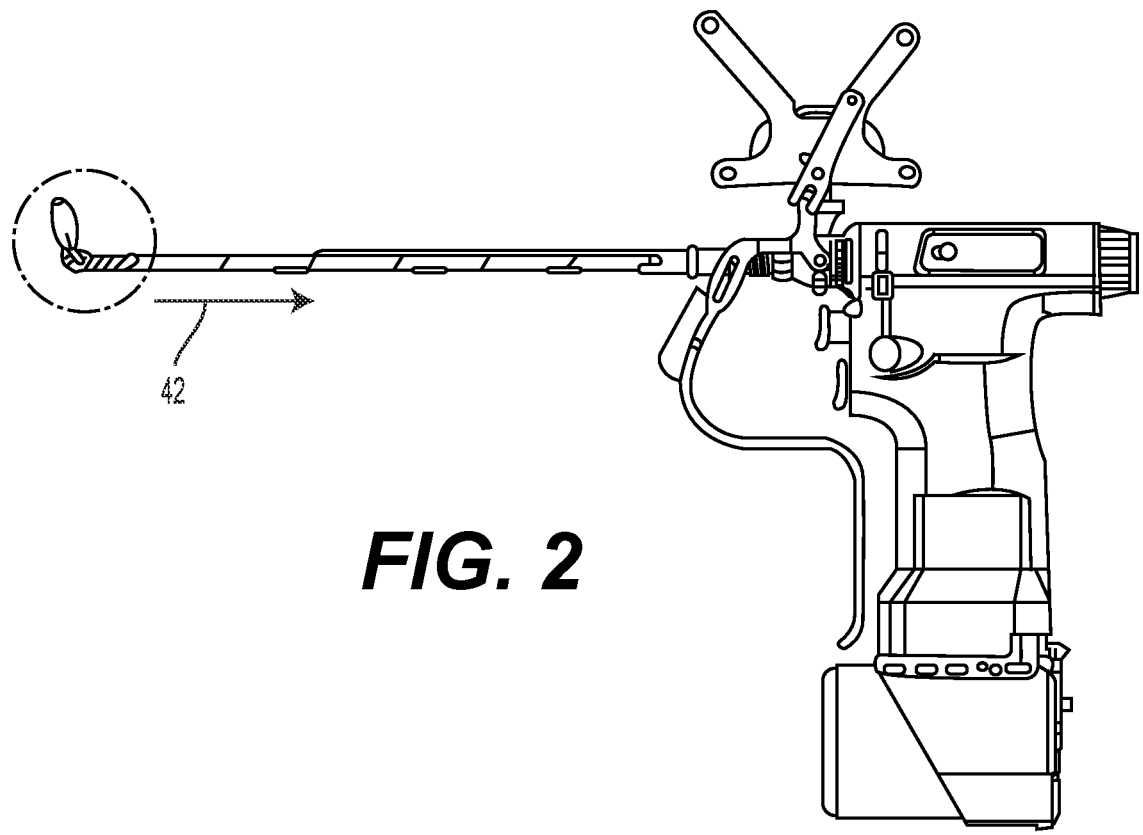
FIG. 2 is a side view of the powered discectomy apparatus of the implementation of FIG. 1, showing the cutting tip in an articulated configuration.
Figure 2A:
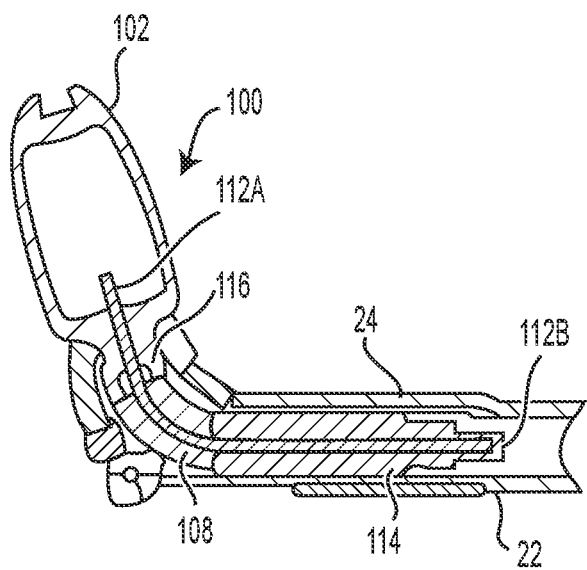
FIG. 2A is a detailed view of the cutting assembly shown in FIG. 2 illustrated in an articulated configuration.

FIGS. 1-2A illustrates the powered discectomy device 10 of the present application. The device 10 presents an advantage over present designs as it allows for access into a minimal window and articulation to allow access to the intervertebral space and removal of disc material.

The device 10 comprises a powered unit 12, a shaft assembly 20 and a cutting assembly 100. The power unit 12 is preferably handheld and is designed to have an ergonomic design for ease of operation and comfort. The power unit 12 can feature an electric motor that is either powered by plugging into a power source or by battery. A replaceable and rechargeable battery pack can be placed along the base of the unit 12 and can be recharged in sterile conditions.

As shown in FIGS. 1-6, the shaft assembly 20 comprises an outer sheath 22, an inner sheath 24, a handle 16 and mounting assembly therefore and an assembly for imparting motion from the power unit 12 to the inner shaft. The inner shaft 24 is mounted with outer shaft 22 such that the inner shaft can rotate therein. In this implementation, the outer shaft 22 is mounted so that it is free to translate at least partially along the longitudinal length of inner shaft 24 as indicated by arrow 2. The inner 24 and outer 22 shaft are hollow and have a circular cross-section. The shafts 24, 22 can be constructed of a flexible or rigid material and, as will be described in greater detail below, are both mounted to the power or drive unit 12 in a manner that allows removal for sterilization or replacement.

As shown in FIGS. 1-2A, a cutting assembly 100 is located at the distal end of shaft assembly 20. The cutting assembly includes a cutting tip 102 which is pivotably mounted to the inner shaft 24 by a linkage 106. The linkage 106 comprises two arms 108A and 108B that are fixed to the inner shaft 24 and the cutting tip 102 by pins 118A, 118B and 118C. Each pin allows for rotation of the cutting tip 102. Pin 118A connects the arm 108A at its proximal axis to the inner shaft 24. As will be described in greater detail below, the cutting tip 102 is biased in an upward direction, shown in FIGS. 2 and 2A. When allowed to do so, the tip 102 pivots about its proximal axis at pin 118A.

Figure 1A:
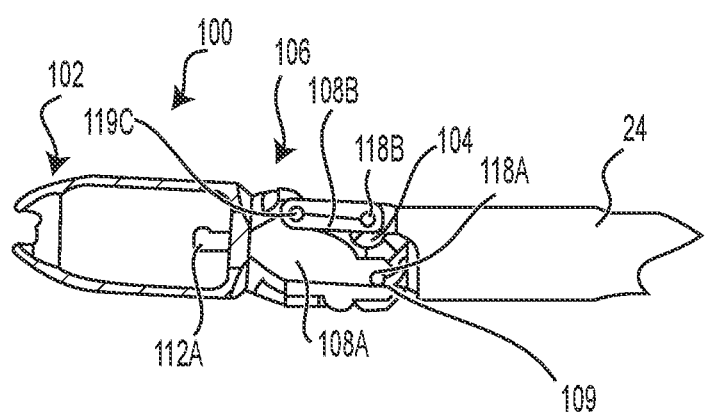
FIG. 1A is a detailed view of the cutting assembly shown in FIG. 1 illustrated in a straight configuration.

As illustrated in FIGS. 1 and 1A, the outer shaft 22 is disposed such that its distal end 25 substantially encloses the linkage 106. This forces the linkage 106 to sit in longitudinal alignment with the inner 24 and outer 22 shafts. This configuration is optimal for insertion of the shaft assembly 20 into a surgical window created for access to the interspinous space to be treated. Often, a minimally invasive surgical technique employs a narrow port. Once the shaft assembly 20 is placed within the access port the cutting assembly 100 is located proximal to the disc material to be removed. At this point, the outer shaft 22 is withdrawn in a proximal direction along the longitudinal length of the inner shaft 24. As shown in FIGS. 2 and 2A, this results in the cutting tip 102 being free to pivot about its proximal axis 118A and articulate to reach across the intervertebral space. In one possible implementation and corresponding operation, while this articulation is occurring, the powered drive 12 is imparting torque to the cutting tip 102, causing the removal of disc material.

Figure 7:
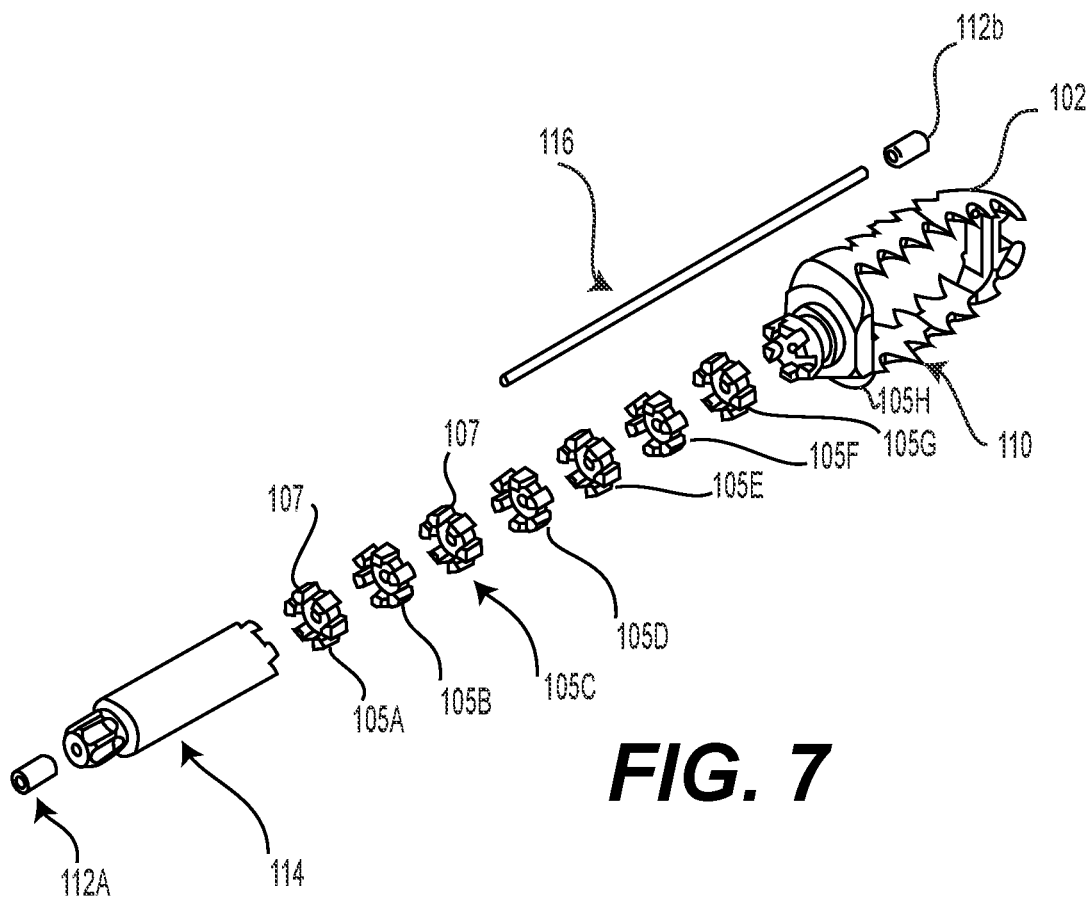
FIG. 7 is an oblique assembly view of one possible implementation of a cutting assembly according to the present disclosure.
Figure 8:
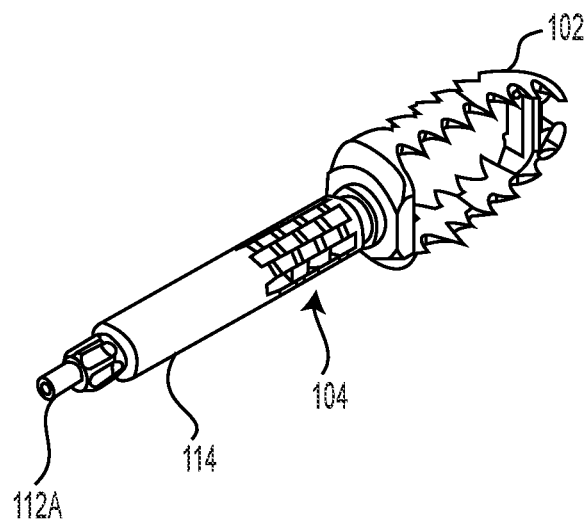
FIG. 8 is an oblique view of the cutting assembly of the cutting assembly implementation of FIG. 7.

FIGS. 7 and 8 illustrate the cutting assembly 100 in greater detail. The assembly 100 comprises the cutting tip 102, disc joints 104 and a drive pin 114. Disc joint 104 comprises individual, linked discs 105A-H that are mounted between a drive pin 114 and the cutting tip 102. As illustrated, the disc joints 105A-H include engagement features or teeth 107 that are displaced around the circumference of each disc. Each disc 105 has these features 107 angularly offset with respect to the next adjacent disc such that when assembled each disc meshes with the adjacent disc 105.

As shown in FIGS. 7 and 8, and only intended as an example, eight discs 105 A-H are connected that allow for 10° of angulation at each interface, allowing for a total of 80° of articulation. The number of discs could be increase or reduced. As the number of discs is reduced, the amount of angulation required at each interface is increased. By way of example, to reach the same 80° of angulation with 3 discs, there would be 4 interfaces needing to angle 20° each. The number of engagement features 107 on each disc could also be varied. The size of each tooth increases as the number of teeth decreases.

Each of the cutting tip 102, disc joints 105 and drive pin 114 are mounted on a flexible shaft 116 that can be constructed from materials such as nitinol. The tip 102, along with articulating drive components or disc joints 105 is constrained together by crimping caps 112A and 112B onto a super-elastic nitinol shaft 116 that runs through the center of the components. The nitinol is flexible enough to allow the full articulation and rotation of the cutting tip 102. The nitinol is pre-biased or memory shaped such that it biases toward a bend. Thus, as outer sheath 24 is withdrawn in increasing amounts the cutting assembly bends to an increasing angulation.

Figure 9:
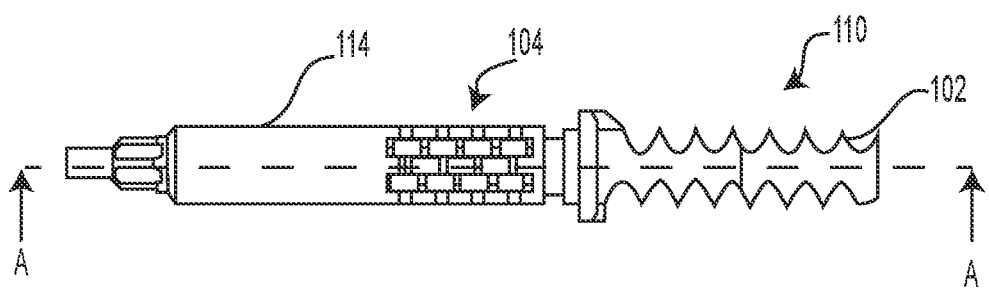
FIG. 9 is a side view of an implementation of a cutting assembly of the present disclosure.
Figure 10:
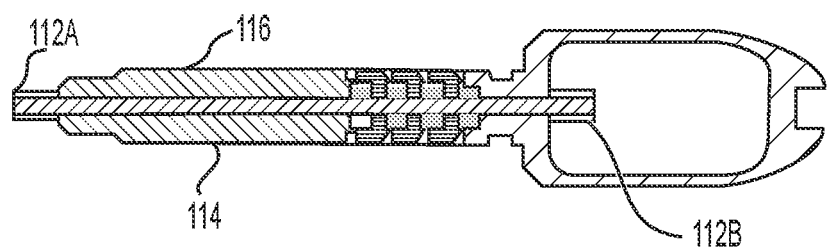
FIG. 10 is a view taken along line A-A of FIG. 9.
Figure 11:
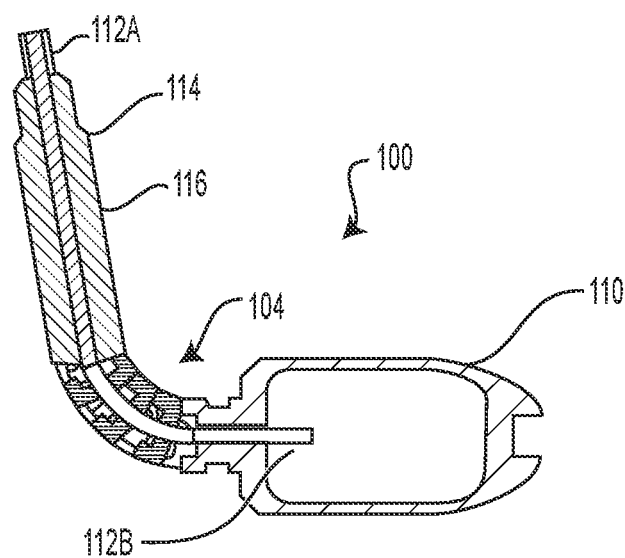
FIG. 11 is a side view of the cutting assembly shown in FIG. 10 showing the cutting assembly in articulated configuration.

FIGS. 9-11 illustrate the operation of the cutting assembly 100. As shown in FIGS. 9 and 10, when constrained the cutting assembly 100 remains longitudinally aligned, including the nitinol shaft 116. When unconstrained, for example, by removing the outer sheath 24 from the distal end 25 of the inner sheath 22 the nitinol shaft returns to its biased position and actuates disc joint 104, see FIG. 11.

The cutter assembly 100 is designed to allow removal from the overall tool and replacement as a disposable assembly. The cutting tip 102 can have a variety of shapes and configurations. One configuration is a tip with jagged cutting edges 102 which grab and retain disc material. The design of the tip 102 is such that it can easily cut tissue but is not suited to cut harder material such a vertebral bone without exerting greater and purposeful effort. Alternatively, the cutting tip 102 may be replaced by a shaft with roughened surfaces. Such a shaft can be biased to incrementally bend in a range of angles as it is moved through a desired cutting motion. Still another cutter geometry implementation may comprise multiple individual, metallic strands spaced and otherwise configured to reduce the tendency to cut into bone. Still other cutter configurations and geometries are possible and are likewise contemplated by this disclosure.

Figure 5:
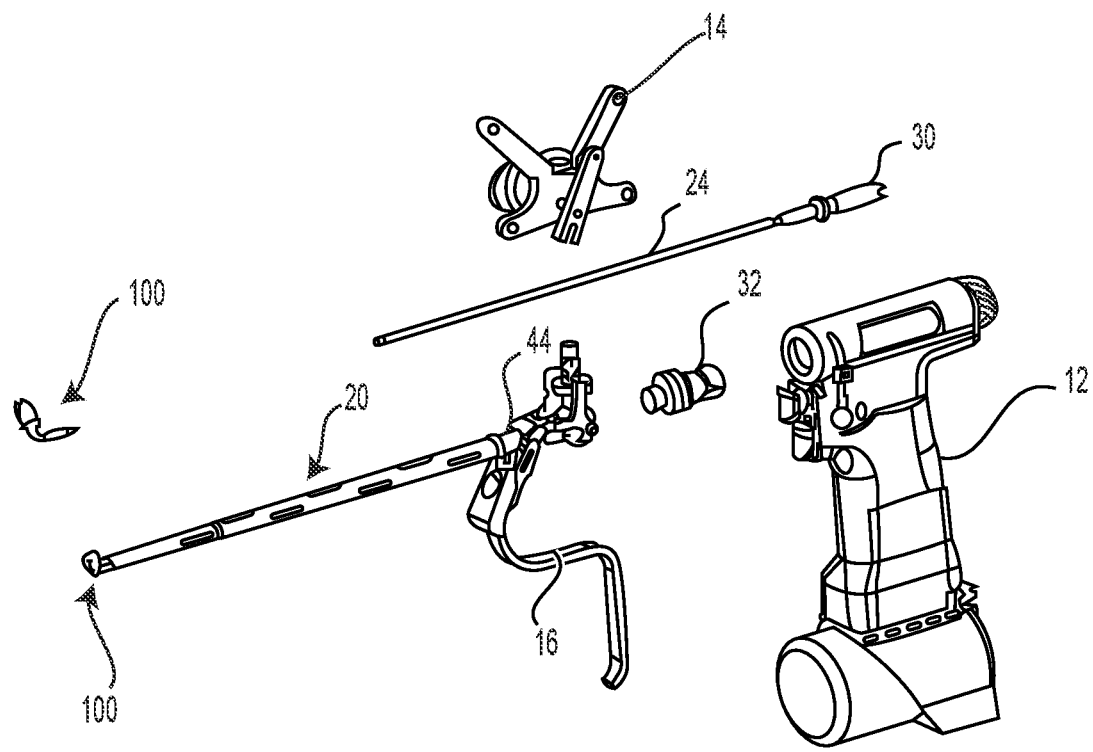
FIG. 5 is an oblique assembly view showing one possible implementation of an inner shaft drive mechanism according to the present disclosure.
Figure 6:
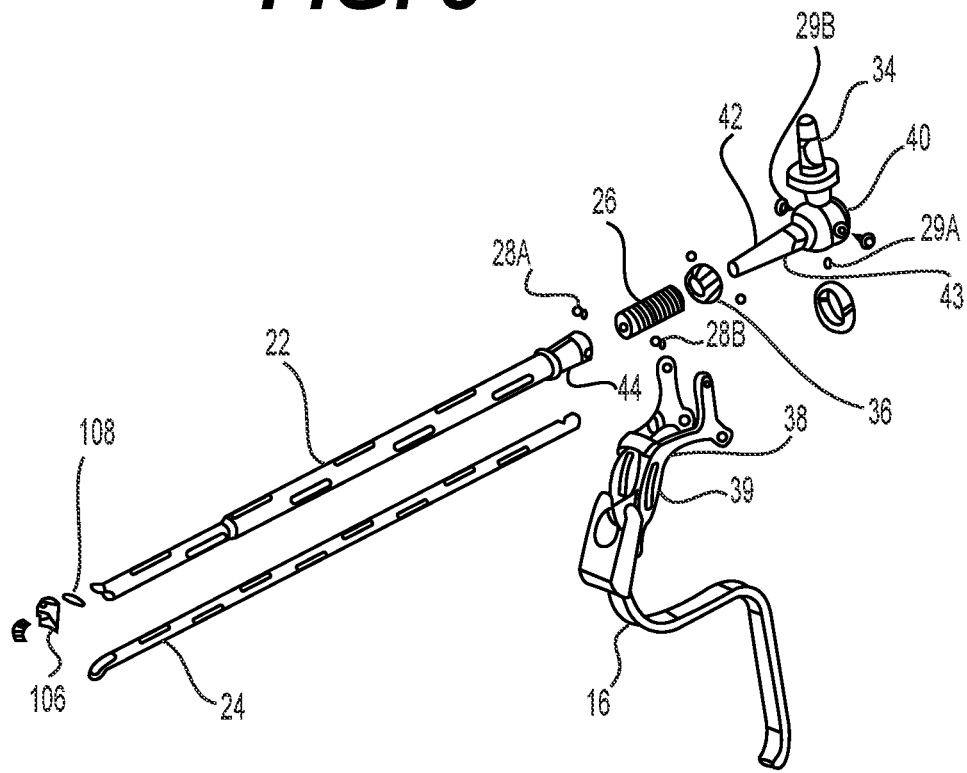
FIG. 6 is an oblique assembly view showing one possible implementation of an outer shaft mounting assembly of the present disclosure.

The inner sheath 24 is connected to the powered drive 12 so that the drive 12 imparts motion, such as rotational motion, thereto. As shown in FIG. 5, the driver 12 is connected to inner sheath 24. The inner sheath 24 includes a bearing collar 30 at its proximal end. The bearing collar 30 is mounted with a transmission link 32 which in turn is mounted within the driver 12. As shown in FIGS. 1 and 6, outer sheath 22 is fixedly attached to driver 12 by a housing 40 that is attached at its proximal end to powered driver 12. The housing 40 includes an elongated extension 42. The proximal end of outer sheath 22 includes a collar 44 that is mounts extension 42.

Outer sheath 22 is actuated by means of an assembly comprising a handle or trigger 16, a spring 26 and a mounting nut 36. The proximal end of elongated extension 42 includes external threads 43. The mounting nut 36 includes internal threads such that the nut is threaded onto the proximal, externally threaded end of elongated extension 42. Interposed between the collar 44 of outer shaft 24 and the mounting nut 36 is a spring 26. As shown with additional reference to FIGS. 3A and 3B, the handle includes and actuation arm 38 which straddles, and is pivotably attached to the housing 40 by pins 29A and 29B. Arm 38 also includes at least one slot 39. Pins 28A and 28B (if there are two slots) are mounted on the proximal end of outer shaft 22, on collar 44.

Located at the top of the housing 40 is an upper handle mount 34 for upper handle 14. Upper handle mount 34 may provide an alternate to handle 16. In addition, as the cutting tip 102 is being articulated, upper handle 14 can be correlated to the tip 100 such that it may be employed to track the angular position of the cutting tip.

Figure 3A:
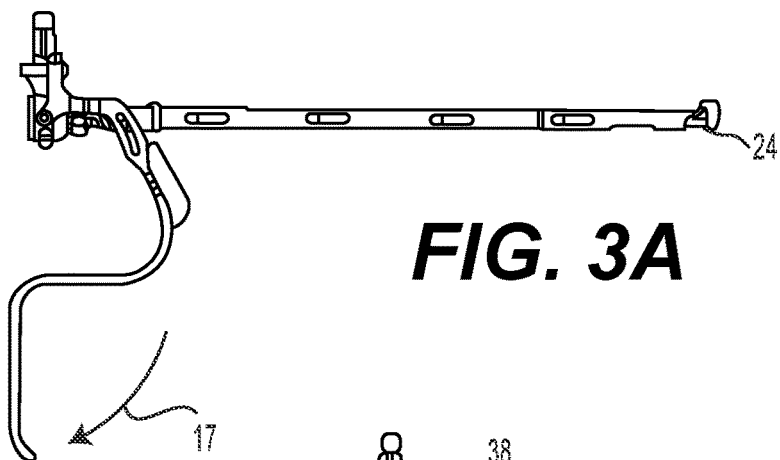
FIG. 3A is a side view of one possible implementation of a shaft assembly of the present disclosure in an articulated configuration.
Figure 3B:
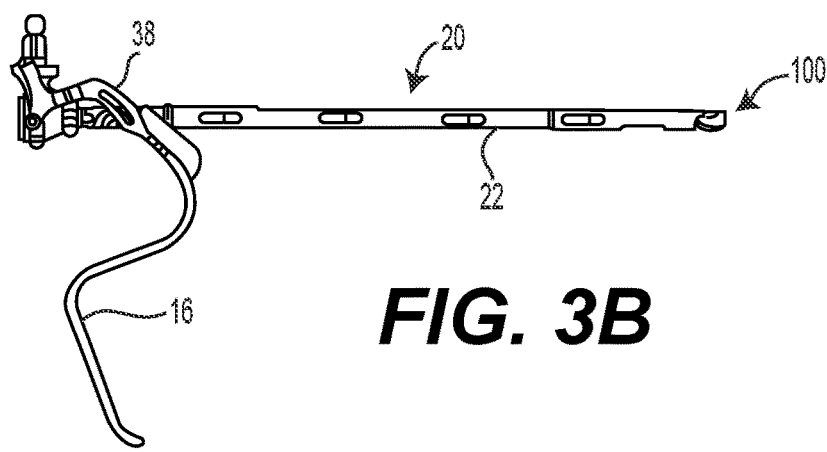
FIG. 3B is a side view of the shaft assembly of FIG. 3A in a longitudinally aligned configuration.
Figure 4A:
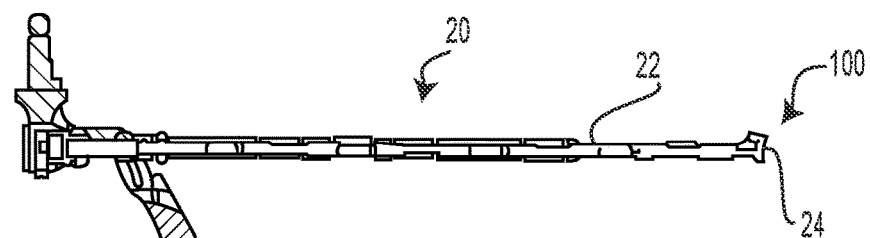
FIG. 4A is a side cut away view of the shaft assembly of the present disclosure in an articulated configuration.
Figure 4B:
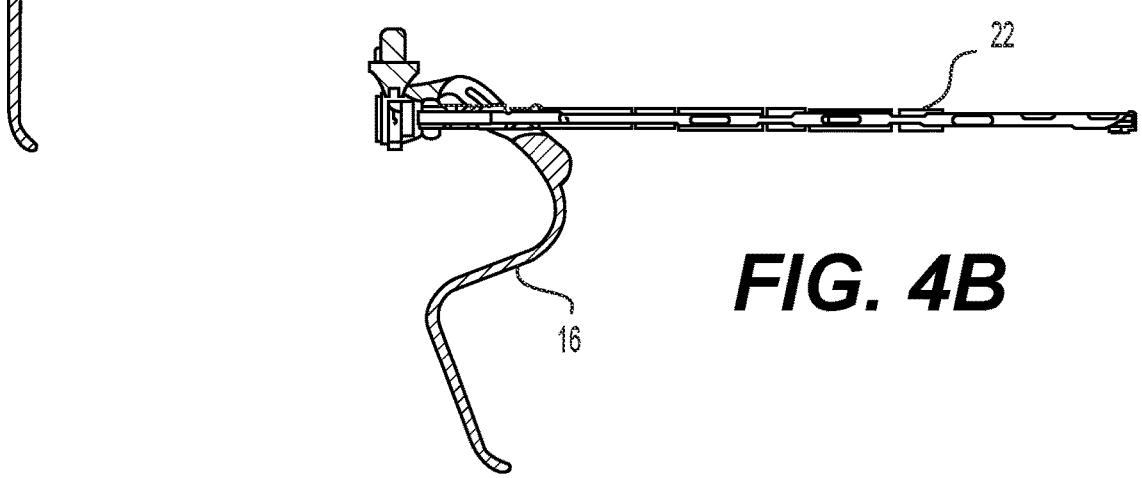
FIG. 4B is a side cut away view of the shaft assembly of the present disclosure in a longitudinally aligned position.

In operation, the shaft assembly is maneuvered through the surgical access port with the handle in the position shown in FIG. 3B. This longitudinally aligned position allows for quick and obstruction-free access to the surgical site. Once positioned, the handle 16 is depressed toward the powered unit 12 in the direction shown by arrow 17. As the handle is moved, the slot 39 in arm 38 engages pin 28A which, in turn, pulls collar 44 and outer shaft 22 in a rearward direction. Spring 26 compresses between collar 44 and nut 36 mounted on the extension 42 proximal to the main body of housing 40. This uncovers the distal end of inner sheath 24 causing the cutting tip 102 to articulate into a desired angular position. Once the handle is released, the spring 26 returns to an unbiased position forcing the outer sheath 22 to move distally and cover the linkage 106, returning the tip 102 to a longitudinally aligned position.

The present disclosure includes that contained in the appended claims as well as that of the foregoing description. Although this invention has been described in its exemplary forms with a certain degree of particularity, it is understood that the present disclosure of has been made only by way of example and numerous changes in the details of construction and combination and arrangement of parts may be employed without departing from the spirit and scope of the invention.

What is claimed is:

1. An apparatus for the removal of an intervertebral disc or a portion thereof, the apparatus comprising:
    a driver manipulated by a user;
    an elongated shaft assembly connected to the driver, the shaft assembly comprising an outer sheath fixedly connected to the driver and an inner sheath connected to the driver so that the driver imparts motion thereto;
    wherein the outer sheath is mounted about the inner sheath so as to translate along the longitudinal length of the inner sheath and to allow the inner sheath to rotate within the outer sheath;
    a cutting assembly mounted at the end of the inner sheath, the cutting assembly including:
        a cutting tip mounted on the distal end of a flexible shaft, the flexible shaft configured to be biased to bend, wherein the proximal end of the flexible shaft is fixed to the distal end of the inner sheath; and
        a link assembly connected to the distal end of the inner sheath and the proximal end of the cutting tip so as to allow the cutting tip to rotate about an axis at its proximal end, wherein during operation of the apparatus, the outer sheath is in a first position along the inner sheath so as to enclose the link assembly, and when the outer sheath is moved in a proximal direction to a second position, the link is exposed allowing the cutting tip to rotate.

2. The apparatus of claim 1, wherein the inner sheath is configured such that a motor on the driver imparts rotational motion thereto.

3. The apparatus of claim 2, further comprising a drive transmission that connects the driver to the inner sheath to impart motion thereto.

4. The apparatus of claim 1, further comprising a mounting assembly for connecting the outer sheath to the driver, allowing the outer sheath to translate in a longitudinal direction along the inner sheath.

5. The apparatus of claim 4, wherein the mounting assembly comprises an elongated housing connected to the driver, the housing having an extending section which fits into a collar located at the proximal end of the outer sheath.

6. The apparatus of claim 5, wherein a mounting nut having external threads is mounted onto threads on the extending section.

7. The apparatus of claim 6, further comprising a spring mounted along the extending section between the nut and the collar.

8. The apparatus of claim 7, further comprising a handle pivotably connected to the housing by a first and a second pin.

9. The apparatus of claim 8, wherein the handle is connected to the proximal end of the housing, the handle including a slot into which fits a cam pin that is on the outside of the collar such that as the handle is squeezed by a user the collar is pulled longitudinally against the spring and the elongated sheath is moved in a longitudinal direction along the inner sheath.

10. The apparatus of claim 1, wherein the inner sheath is constructed from nitinol.

11. An access apparatus capable of articulation in a narrow window during minimally invasive spinal surgery, the apparatus comprising:
   a housing having a main portion and an elongate portion extending from the main portion wherein the elongate portion abuts the main portion and has external threads thereon;
   a first hollow sheath having a proximal end and a distal end;
   a collar attached to and located at the proximal end of the hollow sheath the collar being mounted on the distal end and a central portion of the elongate portion;
   a mounting nut having internal threads and being threadedly attached to the threaded outer surface of the elongate portion;
   a biased member mounted on the outside of the elongate portion and interposed between the mounting nut and the collar;
   a second sheath mounted within the first sheath the second sheath having a distal end with a cutting tip pivotably mounted thereon the cutting tip being movable between a first retained position that is aligned with a longitudinal length of the first hollow sheath and the second sheath and a second unretained position wherein the cutting tip articulates in an angular direction from the longitudinal length of the first hollow sheath and the second sheath;
   wherein the distal end of the first hollow sheath covers a portion of the cutting tip so as to retain the tip in the first retained position such that when the proximal end of the first hollow sheath actuated toward the mounting nut, against the force of the biased member, the distal end of the first hollow sheath is removed from covering a portion of the cutting tip, allowing the cutting tip to obtain the second unretained position; and
   wherein when the proximal end of the first hollow sheath is no longer actuated, the biased member returns the first hollow sheath to a position covering the distal end of the second sheath.

12. The apparatus of claim 11, further comprising a trigger connected to the collar so as to actuate the collar in a proximal direction toward the mounting nut.

13. The apparatus of claim 12, wherein the trigger comprises a handle having an actuation arm connected to its proximal end the actuation arm pivotally connected to the main portion of the housing.

14. The apparatus of claim 13, wherein the actuation arm has at least one slot thereon, the slot cooperating with a pin located on the collar wherein as the handle is squeezed the pin follows the slot moving the collar in a proximal direction toward the mounting nut.

15. The apparatus of claim 11, further comprising a powered drive.

16. The apparatus of claim 15, wherein the housing is fixedly attached to the powered drive, the housing having an opening that extends through the main portion and the elongate portion.

17. The apparatus of claim 16, wherein a motion imparting feature of the powered drive is connected to the second sheath so as to impart motion thereto.

18. The apparatus of claim 17, wherein the second sheath is mounted to the powered drive by a transmission link, the link being contained within the housing and the second sheath extending therefrom to the distal end of the first hollow sheath.

* * * * *